3,288,833
2-ALKENYL AND 4-ALKENYL DERIVATIVES OF 3-OXO-CYCLOPENTYLACETIC ACID ESTERS

Edouard Demole, Geneva, Switzerland, assignor to Firmenich et Cie, Geneva, Switzerland
No Drawing. Filed Feb. 18, 1963, Ser. No. 259,399
Claims priority, application Switzerland, Feb. 23, 1962, 2,258/62
6 Claims. (Cl. 260—468)

The present invention relates to new fragrant cyclopentylacetic acid derivatives which are useful as olfactive agents in perfumery and in the manufacture of scented compositions.

The derivatives of this invention are racemic compounds of the general formula

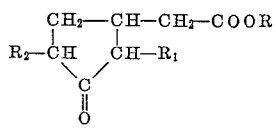

(I)

wherein one of the symbols $R_1$ and $R_2$ represents hydrogen and the other an unsubstituted alkenyl group having 5 carbon atoms, and R represents methyl or ethyl. The alkenyl radical represented by $R_1$ or $R_2$ can be, e.g., a cis- or trans-1-penten-1-yl, cis- or trans-2-penten-1-yl, cis- or trans-3-penten-1-yl, 4-penten-1-yl or 3-methyl-2-buten-1-yl radical. A preferred class of the compounds represented by Formula I includes those in which the alkenyl radical is unbranched and has its double bond in the 2,3-, 3,4- or 4,5-position and in which R is methyl or ethyl, preferably methyl.

In accordance with the invention those compounds of Formula I in which $R_1$ or $R_2$ is a $-CH_2-CH=CH-C_2H_5$ or $-CH_2-CH=C(CH_3)_2$ group are obtained by condensing a methyl or ethyl 3-oxo-cyclopentylacetate with a cyclic secondary amine in order to obtain a mixture of two isomeric enamines, subjecting this mixture to the action of a substituted allyl halide, e.g. the cis- and trans-isomers of 1-bromo-2-pentene or 1-bromo-3-methyl-2-butene, and hydrolysing the reaction product in order to obtain a mixture of methyl or ethyl 2- and 4-(2-alkenyl)-3-oxo-cyclopentylacetates and, if desired, separating the individual position isomers from their mixture.

Depending on the geometric position of the substituents in the ethylenic group of the substituted allyl halide used in this process, the substituted cyclopentyl-acetates are obtained either in the cis- or trans-form.

In this process there are invariably obtained mixtures of two position isomers which are distinguished by the position of the alkenyl group on the nucleus. These isomers can be separated via their semicarbazones, by fractional distillation or by preparative gas-liquid chromatography.

In accordance with the invention, the same compounds of Formula I in which $R_1$ or $R_2$ is a $$-CH_2-CH=CH-C_2H_5$$

or $-CH_2-CH=C(CH_3)_2$ group are also obtained by condensing methyl or ethyl 3-oxo-cyclopentyl-acetate with a cyclic secondary amine in order to obtain a mixture of two isomeric enamines, subjecting this mixture to the action of a 1-halo-2-alkyne, e.g. 1-bromo-2-pentyne, and hydrolysing the reaction product to form a mixture of methyl or ethyl 2- and 4-(2-alkynyl)-3-oxo-cyclopentyl-acetates, subjecting this mixture or anyone of the two isomers separated from their mixture to a catalytic semi-hydrogenation in the presence of a palladium catalyst dispersed on a mineral vehicle in order to obtain a methyl or ethyl 2- or 4-(2-cis-alkenyl)-3-oxo-cyclopentyl-acetate or a mixture of these position isomers.

In the process defined above the two position isomers of the substituted cyclopentyl-acetates are obtained exclusively in the cis-form. These position isomers can be separated from their mixtures via their semicarbazones, by fractional distillation or by preparative gas-liquid chromatography. Instead of separating the position isomers from their mixture obtained by semihydrogenation, it can sometimes be advantageous to separate the 2- and 4-(2-alkynyl)-3-oxo-cyclopentyl-acetates formed as intermediates and to hydrogenate separately the individual isomers.

The sequence of the reactions of the synthesis described above can be represented by the following reaction scheme in the case where pyrrolidine is used as the cyclic secondary amine and 1-bromo-2-pentyne is used as the halo-alkyne.

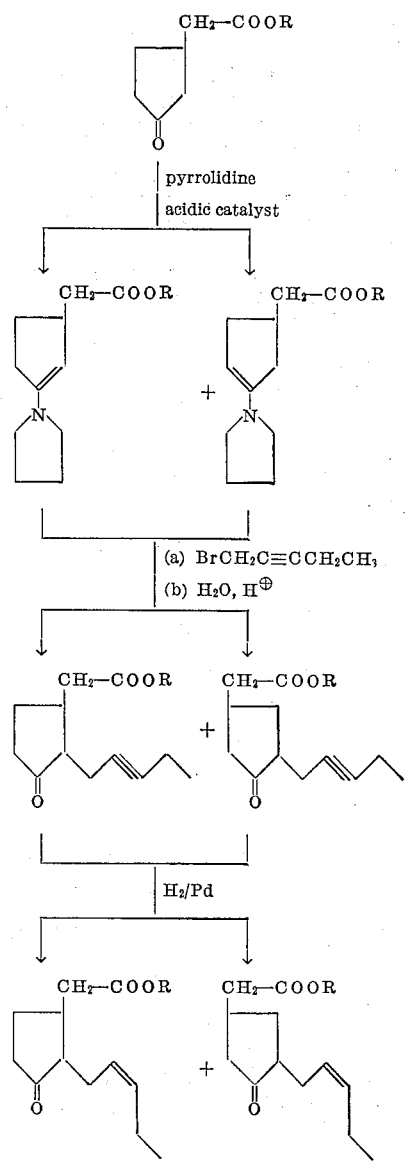

R=methyl or ethyl

The process defined above can be carried out in the following manner: In the first step the cyclic secondary amine, e.g. pyrrolidine, morpholine or piperidine, is condensed with the methyl or ethyl 3-oxo-cyclopentyl-acetate in the presence of an acidic catalyst, such as an arylsulfonic acid, e.g. p-toluenesulfonic acid, using e.g. benzene as the reaction medium. The condensation is effected by heating the reaction mixture in a nitrogen atmosphere, the water formed as a result of the condensation being continuously eliminated by azeotropic distillation.

In the second step the reaction between the mixture of the isomeric enamines and the halo-alkyne, e.g. 1-bromo-2-pentyne, is carried out in an anhydrous organic solvent, e.g. in dioxane, benzene, methanol or chloroform, by refluxing.

In the third step the regeneration of the cyclopentanonic structure by elimination of the cyclic secondary amine is readily brought about by hydrolysing the reaction product of the second step with an aqueous mineral acid, such as aqueous sulfuric acid.

The fourth step consisting of the partial hydrogenation of the triple bond of the isomeric 2-alkynyl-3-oxo-cyclopentyl-acetates is carried out either with the mixture of the isomers as obtained in the third step or separately with the individual isomers after their isolation from the mixture. This partial hydrogenation is effected by known methods by means of a conventional palladium catalyst, e.g. palladium deposited on $CaCO_3$. The isomeric alkyl 2-alkenyl-3-oxo-cyclopentyl-acetates resulting from the hydrogenation of the mixture of the corresponding alkyne compounds can be separated by treating the mixed isomers with semicarbazide acetate and subjecting the mixture of the semicarbazones obtained to a fractional crystallisation. This separation can also be brought about by fractional distillation or by preparative gas-liquid chromatography.

The methyl and ethyl 3-oxo-cyclopentyl-acetates used as starting materials in the two processes described above can be obtained by esterification of 3-oxo-cyclopentyl-acetic acid. The latter can be obtained from $\Delta^\beta$-dihydromuconic acid [cf. H. Rupe, Lieb. Ann., 256, 26 (1890) and R. Ahmad et al., J. Chem. Soc., 1952, 4092] which is converted into its di-methyl or di-ethyl ester (cf. R. P. Linstead et al., J. Chem. Soc., 1953, 1228). The obtained alkyl $\Delta^\beta$-dihydromuconate is then condensed with methyl or ethyl malonate and the alkyl 2,4-dicarbalkoxy-3-oxo-cyclopentyl-acetate is saponified and decarboxylated to form 3-oxo-cyclopentyl-acetic acid (cf. E. H. Farmer, J. Chem. Soc., 1923, 3324).

In accordance with the invention the compounds of Formula I in which $R_1$ or $R_2$ is a —$CH_2$—CH=CH—$C_2H_5$ or —$CH_2$—CH=C($CH_3$)$_2$ group are also obtained by mono-decarboxylating a lower alkyl 2,4-dicarbalkoxy-3-oxo-cyclopentyl-acetate by means of warm aqueous acetic acid, esterifying the resulting mixture of 2- and 4-carbalkoxy-3-oxo-cyclopentyl-acetic acids to form a mixture of methyl or ethyl 2- and 4-carbalkoxy-3-oxo-cyclopentyl-acetates, condensing this mixture in the presence of a basic condensing agent with a 1-alken-3-ol, e.g. 3-hydroxy-1-pentene or 3-methyl-3-hydroxy-1-butene, in order to obtain a mixture of methyl or ethyl 2- and 4-(2-trans-alkenyl)-3-oxo-cyclopentyl-acetates and, if desired, separating the individual isomers from their mixture.

This process yields mixtures of methyl or ethyl 2- and 4-(2-alkenyl)-3-oxo-cyclopentyl-acetates in their trans-form. The position isomers can be separated by the methods mentioned above.

The condensation of the 1-alken-3-ol with the methyl or ethyl 2,4-dicarbalkoxy-3-oxo-cyclopentyl-acetate can be carried out by known methods (cf. M. F. Carroll, J. Chem. Soc., 1940, 704, 1266; 1941, 507). Aluminium isopropoxide is preferably used as the basic condensing agent.

The sequence of the reactions in the process described above can be represented by the following reaction scheme:

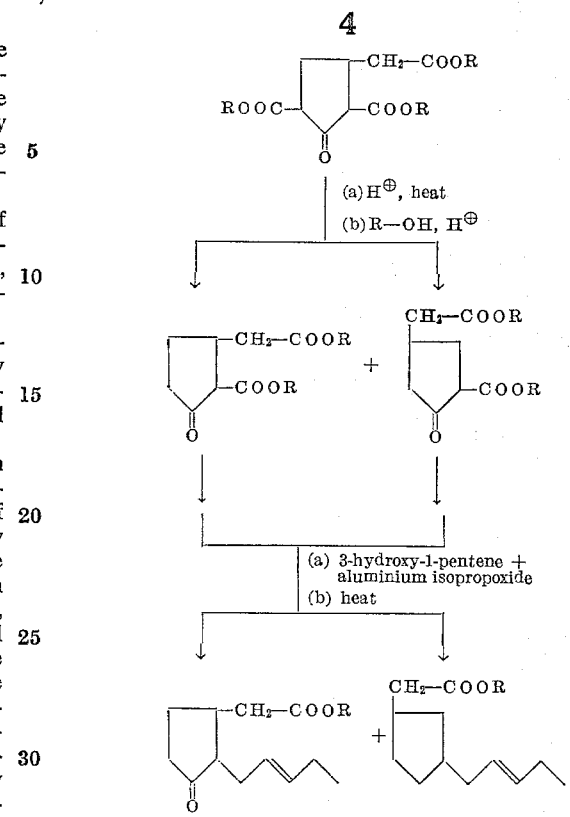

R=methyl or ethyl

In accordance with the invention the compounds of Formula I in which $R_2$ is hydrogen and $R_1$ is a pentenyl group having its double bond in the 3,4- or 4,5-position are obtained by condensing an organo-magnesium compound of the formula XMg—$CH_2$—$CH_2$—CH=CH—$CH_3$ or XMg—$CH_2$—$CH_2$—$CH_2$—CH=$CH_2$ where X is a halogen, with an alkyl enol ether of cyclopentan-1,2-dione and hydrolysing the resulting metal-organic compound in order to obtain a 2-alkenyl-2-cyclopenten-1-one, adding bis-tetrahydropyranyl malonate to the cyclic double bond of this ketone in the presence of an alkaline catalyst in order to obtain a bis-tetrahydropyranyl 2-alkenyl-3-oxo-cyclopentyl-malonate, hydrolysing this malonate by the action of warm aqueous acetic acid, decarboxylating the resulting substituted malonic acid, and esterifying the obtained 2-alkenyl-3-oxo-cyclopentyl-acetic acid to convert it into its methyl or ethyl ester.

The alkyl enol ether of cyclopentan-1,2-dione which is one of the starting materials of the process defined above can be obtained by subjecting cyclopentan-1,2-dione to the action of a primary alkanol in the presence of an acid catalyst, e.g. an arylsulfonic acid. It is advantageous to use the isobutyl enol ether which is obtained e.g. according to M. F. Ansell and J. W. Ducker, J. Chem. Soc., 1959, 329. The organo-magnesium compound used as the other starting material in the process defined above can be e.g. cis- or trans-3-penten-1-yl bromide or 4-penten-1-yl bromide.

In accordance with a modification of the process described above mono-methyl or mono-ethyl mono-tetrahydropyranyl malonate is used instead of bis-tetrahydropyranyl malonate. This modification simplifies the synthesis inasmuch as the methyl or ethyl 2-alkenyl-3-oxo-cyclopentyl-acetate can be obtained directly by partially saponifying the mono-alkyl mono-tetrahydropyranyl 2-alkeny-3-oxo-cyclopentyl-malonate under mild conditions and decarboxylating the resulting substituted malonic semi-ester. The partial saponification of the substituted mixed malonate is readily brought about by heating in a weakly acid aqueous medium, e.g. in aqueous acetic acid.

The process described above can be represented by the following reaction scheme:

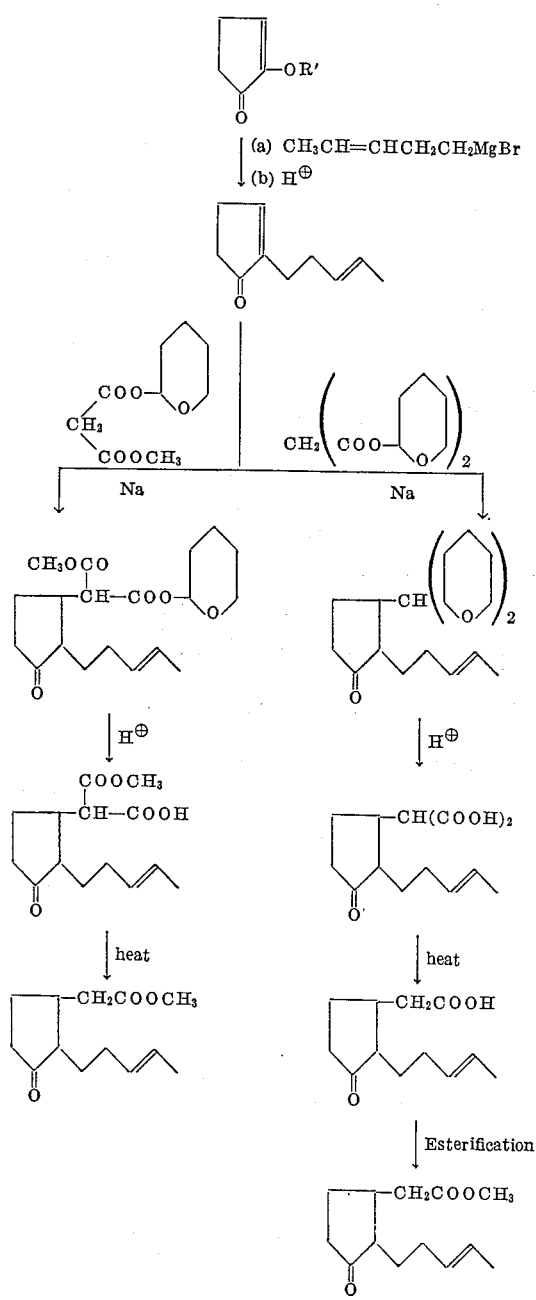

R'=isobutyl

The compounds of the present invention are fragrant substances which possess very particular olfactive properties. In the pure, non-diluted state they develop but a faint floral odor which, however, grows very powerful when they evaporate, i.e. when they are in a state of high dilution. When admixed with other odoriferous substances, the new compounds develop unexpectedly powerful fragrant effects. They exalt and round off in a striking manner the fragrance of odoriferous compositions and impart fine and elegant notes to many perfumes. They are capable of developing a very pronounced white flower note in perfume compositions and, moreover, act as fixatives for many other odoriferous substances. The proportions in which the new compounds are used to produce a desired effect vary within wide limits and depend on the odor type of the composition to which they are added. In certain cases very small amounts, e.g. of about $1/10°/_{oo}$, based on the total weight of a fragrant composition, are sufficient for developing a powerful odoriferous effect. In order to modify the odor of compositions of the floral type, the new odoriferous substances can be added, e.g., in amounts of $1/10°/_{oo}$ to 4.5%, based on the total weight of the composition. If fragrances having a white flower note are to be obtained, it may be advantageous to use 1.5 to 9% by weight of the substances of this invention. In certain cases, e.g. in the preparation of reinforcing agents, i.e. compositions which are not complete or finished perfumes but which are used as additives for other fragrant materials, the proportions of the new compounds can be increased to 30% by weight or more, based on the total weight of a composition. The expressions "fragrant material" and "scented composition" as used herein are meant to include perfume oils or essences, cosmetic products, soaps, detergents, aerosols, and in a broader sense products the odor of which is improved, modified, enhanced or masked by the incorporation of odoriferous ingredients.

The following examples show how the invention can be carried out.

*Example 1*

(a) *Preparation of methyl 2-(2-pentyn-1-yl)-3-oxo-cyclopentyl-acetate.*—A mixture of 152 e.g. (0.977 mole) of methyl 3-oxo-cyclopentyl-acetate, 74.0 g. (1.04 moles) of freshly distilled pyrrolidine, 100 mg. of p-toluene-sulfonic acid and 2000 ml. of absolute benzene is heated to reflux temperature, in a nitrogen atmosphere, in a reactor provided with a water separator. After 17.5 ml. (1 equivalent) of water have been collected within 2 hours, 1000 ml. of benzene are distilled off, and the remainder is concentrated to dryness in vacuo. The residue is a crude mixture of the isomeric enamines.

This crude product is mixed with 72.0 g. (0.489 mole) of freshly distilled 2-pentyn-1-yl bromide and 400 ml. of absolute dioxane. The mixture is refluxed for two hours, whereupon the reaction mixture is concentrated to dryness in vacuo. 1000 ml. of water and 220 ml. of 2 N sulfuric acid are added to the residue, and the whole is heated for 30 minutes. After cooling, the reaction mixture is twice extracted with ether. The ethereal extracts are washed once with water, 3 times with 10% hydrochloric acid, once with water, 3 times with 10% aqueous sodium carbonate solution and finally three times with water. After drying the extract and eliminating the ether, there are obtained 133 g. of neutral product which is subjected to a fractional distillation in a high vacuum. The fractions distilling over between 78° and 100° C. at 0.001 mm. Hg, viz, a total of 83.7 g. are recovered. The product is again subjected to fractional distillation at 0.001 mm. Hg. The following fractions are recovered:

|   |   | G. |
|---|---|---|
| (1) | B.P.=101.5–106.5° | 15.05 |
| (2) | B.P.=106.5° | 9.01 |
| (3) | B.P.=107–110° | 34.30 |
| (4) | B.P.=111–111.5° | 7.39 |
| (5) | B.P.=up to 115° | 6.00 |

Fractions 1 to 5 consist of mixtures of methyl 2- and 4-(2-pentyn-1-yl)-3-oxo-cyclopentyl-acetates in varying proportions.

(b) *Isolation and purification of methyl 2-(2-pentyn-1-yl)-3-oxo-cyclopentyl-acetate.*—Fractions 1 and 2 are combined, and 22.88 g. (0.103 mole) of the mixture are added to a filtered solution of 13.80 g. (0.124 mole) of semicarbazide hydrochloride and 25.20 g. (0.185 mole) of hydrated sodium acetate in 450 ml. of methanol. The mixture is briefly boiled, then cooled, and 300 ml. of water are added thereto. The solution is allowed to stand for 2 hours at 0° C. whereupon a first crop of 11.56 g.

of crystals (M.P.=159–166° C.) is recovered. 630 ml. of water are added to the mother liquors, and the solution is allowed to stand overnight at 4° C. There is then recovered a second crop of 5.57 g. of crystals (M.P.=135–161° C.).

13.76 g. of fraction 3 are subjected to the same treatment. There are thus obtained 9.63 g. of semicarbazone (M.P.=130–160° C.). This product is combined with the second crop (5.57 g.) obtained from fractions 1 and 2, and the mixture is recrystallized from 380 ml. of warm methanol. The solution is allowed to stand overnight at 0° C. whereupon 7.80 g. of semicarbazone (M.P.=166–168° C.) are recovered. This product is combined with the first crop (11.56 g.) obtained from fractions 1 and 2, and the mixture is recrystallized from 380 ml. of methanol. There are thus obtained 17.12 g. of semicarbazone melting at 167–169.5° C. The melting point remains constant at 169–171° C. after a further recrystallization.

The pure semicarbazone thus obtained is mixed with the equal weight of oxalic acid dissolved in 500 ml. of water and refluxed for 10 minutes. The reaction mixture is chilled and twice extracted with ether. The extracts are washed twice with hydrochloric acid and 4 times with water. This extract yields 12 g. of methyl 2-(2-pentyn-1-yl)-3-oxo-cyclopentylacetate. A sample purified by distillation (B.P.$_{0.002}$=88° C.) has the following properties: $n_D^{22.5}$=1.4780, $d_4^{23}$=1.051.

(c) *Preparation of methyl 2-(2-cis-penten-1-yl)-3-oxo-cyclopentyl-acetate.*—9.67 g. (43.5 millimoles) of pure methyl 2-(2-pentyn-1-yl)-3-oxo-cyclopentyl-acetate (prepared via its semicarbazone) are hydrogenated in the presence of 430 mg. of palladium/calcium carbonate catalyst in 75 ml. of petroleum ether (80–100° C.). The hydrogenation is completed after 35 minutes at room temperature, the hydrogen/absorption stopping automatically when 963 ml. of $H_2$ (viz. 99% of the theory) have been absorbed. The hydrogenation mixture is filtered, the distillate is concentrated to dryness and the residue distilled. The fractions distilling over between 79° and 85° C. at 0.001 mm. Hg are collected. A further fractional distillation of the product yields pure methyl 2-(2-cis-penten-1-yl)-3-oxo-cyclopentyl-acetate; $n_D^{22.5}$=1.4722, $d_4^{23}$=1.027.

*Example 2*

(a) *Preparation of methyl 4-(2-pentyn-1-yl)-3-oxo-cyclopentyl-acetate.*—The mother liquors resulting from the crystallization of the semicarbazone of methyl 2-(2-pentyn-1-yl)-3-oxo-cyclopentyl-acetate [cf. Example 1 (b)] are concentrated to dryness and the residue is extracted with ether. From the ethereal extract there are obtained 14.8 g. of a glassy mass which is hydrolyzed by means of aqueous oxalic acid in the manner described in Example 1(b). There are thus obtained 11.5 g. of a product which is subjected to fractional distillation. The fraction distilling at 94–95° C. at 0.001 mm. Hg (about 8 g.) is a mixture containing about 15% of methyl 2-(2-pentyn-1-yl)-3-oxo-cyclopentyl-acetate and 85% of methyl 4-(2-pentyn-1-yl)-3-oxo-cyclopentyl-acetate. A further fractional distillation of his mixture yields pure methyl 4 - (2-pentyn-1-yl) - 3-oxo-cyclopentyl-acetone; $n_D^{21}$=1.4780, $d_4^{21.5}$=1.054.

(b) *Preparation of methyl 4-(cis-2-penten-1-yl)-3-oxo-cyclopentyl-acetate.*—8.77 g. of a mixture containing about 15% of methyl 2-(2-pentyn-1-yl)-3-oxo-cyclopentyl-acetate and 85% of methyl 4-(2-pentyn-1-yl)-3-oxo-cyclopentyl-acetate are hydrogenated under the same conditions as used in the hydrogenation of methyl 2-(2-pentyl-1-yl)-3-oxo-cyclopentyl-acetate [cf. Example 1(c)]. The hydrogenation product is subjected to fractional distillation. About 8 g. of a fraction distilling at 87° C. at 0.001 mm. Hg are recovered, and this fraction is redistilled. There is thus obtained pure methyl 4-(cis-2-penten-1-yl)-3-oxo-cyclopentyl-acetate which has the following properties: $n_D^{21.2}$=1.4715, $d_4^2$=1.023.

*Example 3*

75.0 g. of crude (about 60%) ethyl 2,4-dicarbethoxy-3-oxo-cyclopentyl-acetate are mixed with 500 ml. of glacial acetic acid and 150 ml. of water, and the mixture is refluxed. The reactor is connected to a measuring device for measuring the volume of evolved $CO_2$. The heating is interrupted when the volume of evolved $CO_2$ reaches 1 equivalent, viz. 3580 ml. (measured at 20° C. at 730 mm. Hg). The reaction solution is concentrated in vacuo in the cold in a rotating evaporator, whereupon the residue is dried in a high vacuum of 0.001 mm. Hg for one hour. The product is taken up in 1500 ml. of absolute ethanol containing 150 ml. of concentrated sulfuric acid, and the solution is refluxed for one hour. The reaction mixture is cooled, part of the alcohol (about 1 litre) is removed in vacuo, the concentrate is poured into 2 litres of water, and the mixture is extracted twice with ether. The ethereal extracts are washed twice with a 5% aqueous solution of sodium bicarbonate and twice with water. After removal of the ether, the residue is subjected to a fractional distillation. There are recovered 18.01 g. of a fraction distilling between 100° and 124° C. (mainly at 108°) at 0.001 mm. Hg. This fraction consists of a mixture of ethyl 2-carbethoxy-3-oxo-cyclopentyl-acetate and ethyl 4-carbethoxy-3-oxo-cyclopentyl-acetate and has the following properties: $n_D^{22}$=1.4589, $d_4^{22.5}$=1.117.

In a distillation flask provided with a small Widmer column 13.39 g. (55.3 millimoles) of this mixture of ketodiesters, 4.76 g. (55.3 millimoles) of 1-penten-3-ol and 100 mg. (0.5 millimole) of aluminum isopropoxide are mixed. The mixture is heated for about 1 hour at 110–140° C. 3.1 g. of ethanol formed by transesterification (B.P.$_{730}$=76–90° C.) are recovered. The reaction mixture is then heated to 190–200° C. for 6 hours. The evolution of carbon dioxide is then practically completed. The reaction product is allowed to cool and is then directly distilled at 0.002 mm. Hg. There are obtained 11.5 g. of distillate, the major portion of which distils over between 92° and 95° C. This distillate is subjected to chromatographic fractionation on a column of 250 g. of Mallinckrodt silicic acid. The elution is carried out with mixtures of petroleum ether (80–100° C.) and ethyl acetate 95:5, 80:20 and 50:50. The desired substances are present in the eluate fractions resulting from the 80:20 solvent mixture. After removal of the solvents, the residue is subjected to a fractional distillation at 0.002 mm. Hg, and the fractions distilling between 105° and 108° C. (about 7 g.) are collected. The obtained product consists of a mixture of ethyl 2-(trans-2-penten-1-yl)-3-oxo-cyclopentyl-acetate and ethyl 4-(trans-2-penten-1-yl)-3-oxo-cyclopentyl-acetate. The main fraction distilling between 105–106° C. has the following physical properties: $n_D^{23}$=1.4662, $d_4^{22.5}$=0.9984.

6.857 g. (28.8 millimoles) of the foregoing product are mixed with a filtered solution of 3.85% g. (34.6 millimoles) of semicarbazide hydrochloride and 7.03 g. (51.7 millimoles) of hydrated sodium acetate in 60 ml. of ethanol. The mixture is heated almost to the boiling point, again cooled, and 50 ml. of water are added thereto. Crystallization is allowed to take place at 0° C. The first two crystal crops (1.856 g., M.P.=122–124.5° C., and 0.996 g., M.P.=87–124° C.) are combined and recrystallized from 45 ml. of a 1:1 mixture of ethanol/water. There are obtained 1.895 g. of a product melting at 125–126.5° C. After a further crystallization the melting point remains constant at 126.5–128° C.

1.5 g. (5.08 millimoles) of pure semicarbazone are refluxed for 10 minutes with 1.5 g. of oxalic acid dissolved in 30 ml. of water. After cooling, the reaction mixture is twice extracted with ether. The extract is washed once with 10% hydrochloric acid and 4 times with water. After removal of the ether, the product is taken up in petroleum ether (30–50° C.) and filtered. The soluble fraction (1.015 g.) is distilled at 0.002 mm. Hg. The fractions distilling between 81° and 83° C. are collected. There is thus obtained 0.794 g. of ethyl 2-(trans-2-penten-1-yl)-3-oxo-cyclopentyl-acetate. The main fraction distilling at 81–82° C. has the following physical properties: $n_D^{21.5}=1.4669$, $d_4^{22}=0.9924$.

Ethyl 4-(trans-2-penten-1-yl)-3-oxo-cyclopentyl-acetate is prepared in an analogous manner from its semicarbazone which is obtained by a fractional crystallization of the mother liquors resulting from the crystallization of the semicarbazone of ethyl 2-(trans-2-penten-1-yl)-3-oxo-cyclopentyl-acetate.

Example 4

680 mg. (2.86 millimoles) of ethyl 2-(trans-2-penten-1-yl)-3-oxo-cyclopentyl-acetate are refluxed for 75 minutes with 12 ml. of 0.5 N alcoholic KOH. The reaction mixture is concentrated to dryness in vacuo, the residue is taken up in water, and the solution is twice extracted with ether. The extract is washed once with a 5% KOH solution and 3 times with water. The combined alkaline washings are acidified and twice extracted with ether. After the usual treatment there are obtained 610 mg. of acid product.

This product is dissolved in 18 ml. of absolute methanol containing 1.2 ml. of concentrated sulfuric acid, and the solution is refluxed for 2 hours. The reaction mixture is concentrated in vacuo, the residue is taken up in water and the solution twice extracted with ether. The extract is washed twice with 5% $NaHCO_3$ and 3 times with water. After removal of the ether, the residue is distilled at 0.002 mm. Hg. The fractions distilling between 105° and 115° C. are collected to obtain 564 mg. of methyl 2-(trans-2-penten-1-yl)-3-oxo-cyclopentyl-acetate. The main fraction distilling at 105° C. has the following properties: $n_D^{22}=1.4700$, $d_4^{22}=1.020$.

Methyl 4-(trans-2-penten-1-yl)-3-oxo-cyclopentyl-acetate is obtained in an analogous manner from the corresponding ethyl ester.

Example 5

7.29 g. (0.30 at.) of magnesium turnings and a few iodine crystals are placed in a flask equipped for a Grignard reaction. The flask is rather strongly heated in order to dry and activate the magnesium. The metal is covered with anhydrous ether, and a solution of 49.2 g. (0.33 mole) of trans-3-penten-1-yl bromide in 75 ml. of ether is introduced into the flask. The reaction is completed by refluxing for 60 minutes.

Then there is introduced, while stirring, a solution of 38.6 g. (0.25 mole) of cyclopentan-1,2-dione-isobutyl-enolether in 330 ml. of anhydrous ether at such a rate that the reaction heat maintains the mixture at reflux. The reaction is completed by stirring the reaction mixture for 60 minutes at room temperature. The reaction mixture is then poured into an ice-cold aqueous solution of ammonium sulfate, and 150 ml. of 10% hydrochloric acid are added. The mixture is heated for 5 minutes at 25–30° C., then cooled and twice extracted with ether. The organic phase is washed twice with 5% sodium bicarbonate solution and 3 times with water. After drying the extract and removing the solvent, the residue is distilled at 12 mm. Hg. There are recovered about 30 g. of a fraction distilling within 115° to 120° C. and consisting mainly of 2-(trans-3-penten-1-yl)-2-cyclopenten-1-one.

10.4 g. (0.1 mole) of malonic acid are added portionwise to the solution of 25.2 g. (0.3 mole) of dihydropyrane in 100 ml. of absolute benzene containing one drop of concentrated sulfuric acid, while maintaining the temperature of the mixture below 30° C. The solution gradually becomes clearer. The solution is allowed to stand at room temperature for 5 or 6 hours, and then stirred for 30 minutes in the presence of a small amount of anhydrous sodium carbonate. The liquid phase is decanted and concentrated to dryness in vacuo at a temperature which does not exceed 30° C. The concentrate is taken up in 100 ml. of absolute benzene, and the solution is introduced into a stirred suspension of 2.3 g. (0.1 at.) of powdered sodium in 50 ml. of benzene. The reaction temperature is maintained below 35° C. (cooling with water). When the dissolution of sodium is completed, there are introduced 15.0 g. (0.1 mole) of 2-(trans-3-penten-1-yl)-2-cyclopenten-1-one, whereupon the mixture is refluxed for 3 hours, while stirring. The reaction solution is allowed to stand overnight at room temperature and is then concentrated in vacuo. 200 ml. of 10% acetic acid are added to the residue, and the solution is heated to reflux temperature. The solution is then concentrated to dryness in an ordinary vacuum (about 12 mm. Hg.), the residue is taken up in ether, and the solution is extracted with 5% $Na_2CO_3$. After acidification of the extract and the usual treatment there are obtained about 15 g. of crude 2-(trans-3-penten-1-yl)-3-oxo-cyclopentyl-malonic acid.

This crude product is heated to 150–180° C. in a nitrogen atmosphere until the evolution of $CO_2$ stops. The residue is taken up in 100 ml. of absolute methanol, and the solution is mixed with a solution of 28 ml. of concentrated sulfuric acid in 180 ml. of absolute methanol. The total solution is refluxed for 3 hours, then cooled, and one litre of water is added. The mixture is twice extracted with ether, and the combined extracts are washed 3 times with 5% sodium bicarbonate solution, then twice with water. After drying the extract and removing the solvent, the residue is distilled at 0.001 mm. Hg. There are obtained about 9.7 g. of methyl 2-(trans-3-penten-1-yl)-3-oxo-cyclopentyl-acetate distilling at 85° C. The physical properties of the main fraction of this product are as follows: $n_D^{22}=1.4720$, $d_4^{22}=1.025$.

Example 6

By proceeding in the manner described in Example 5, but using cis-3-penten-1-yl bromide instead of trans-3-penten-1-yl bromide, there is obtained in about the same yield methyl 2-(cis-3-penten-1-yl)-3-oxo-cyclopentyl acetate having the following properties: $n_D^{22}=1.4725$, $d_4^{22}=1.026$.

Example 7

By proceeding in the manner described in Example 5, but using 4-penten-1-yl bromide instead of trans-3-penten-1-yl bromide, there is obtained methyl 2-(4-penten-1-yl)-3-oxo-cyclopentyl-acetate having the following properties: $n_D^{22}=1.470$, $d_4^{21}=1.020$.

Example 8

A mixture of 152.6 g. (0.977 mole) of methyl 3-oxo-cyclopentyl-acetate, 74.0 g. (1.04 mole) of freshly distilled pyrrolidine, 100 mg. of p-toluene-sulfonic acid and 2000 ml. of absolute benzene are refluxed in a nitrogen atmosphere in a reactor equipped with a water separator. There are recovered 17.5 ml. (1 equivalent) of water within about 2 hours. Then 1000 ml. of benzene are distilled off, and the residual product is concentrated to dryness in vacuo.

The residue is mixed with 72.8 g. (0.489 mole) of 1-bromo-3-methyl-2-butene and 400 ml. of absolute dioxane. The mixture is refluxed for 2 hours, then the reaction mixture is concentrated to dryness in vacuo, and 1000 ml. of water and 220 ml. of 2 N sulfuric acid are added to the residue. The mixture is refluxed for 30 minutes, cooled and twice extracted with ether. The combined extracts are washed once with water, three times with 10% hydrochloric acid, once with water, 3 times with 10% sodium carbonate solution and 3 times with water. After drying the extract and removing the solvent, the residue is distilled. There are recovered about 75 g. of a fraction distilling between 75° and 95° C. This fraction consists of a mixture of methyl 2- and 4 - (3 - methyl - 2 - buten - 1 - yl) - 3 - oxo - cyclopentyl-acetate. The main fraction distilling at 85° C. at 0.001 mm. Hg has the following physical properties:

$$n_D^{22}=1.4720, \quad d_4^{22}=1.023$$

The position isomers can be separated by gas-liquid chromatography, by fractional distillation or via their semi-carbazones.

The following examples illustrate the use of the compounds of this invention in perfumery. These examples are not to be construed as a limitation since the claimed compounds are useful for many other applications as will be apparent to those skilled in the art.

*Example 9*

A composition having a chypre type fragrance was prepared by blending the ingredients listed below in the proportions set forth:

| Ingredients—Base composition: | Parts by weight |
|---|---|
| Santal oriental | 60 |
| Bourbon vetiver | 40 |
| Patchouli | 20 |
| Bergamot | 150 |
| Synthetic neroli | 20 |
| Synthetic rose | 60 |
| Rose absolute (Grasse) | 15 |
| Jasmin absolute (Grasse) | 20 |
| Oak moss absolute (50% in ethyl phthalate) | 60 |
| Labdanum resinoid (50% in ethyl phthalate) | 60 |
| Zenzoin resin (Siam; 50% in ethyl phthalate) | 30 |
| Vanillin | 5 |
| Ylang | 45 |
| Methylionone | 60 |
| Coriander | 5 |
| Civet (10% in ethyl phthalate) | 30 |
| Musk ketone | 60 |
| Coumarin | 60 |
| Heliotropin | 30 |
| Linalyl acetate | 90 |
| Cinnamyl acetate | 30 |
| Sweet orange oil | 40 |
| | 990 |

Additive:
Methyl 2-(cis-2-penten-1-yl)-3-oxo-cyclopentyl-acetate _____ 10

1000

The additive imparts to the fragrance of the base composition a more floral note and enhances the effect of the jasmin absolute contained in this composition.

*Example 10*

A composition having a floral type fragrance was prepared by blending the ingredients listed below in the proportions set forth:

| Ingredients—Base composition: | Parts by weight |
|---|---|
| Methyl-nonyl-acetaldehyde (1% in ethyl phthalate) | 20 |
| Undecanal (1% in ethyl phthalate) | 10 |
| Bergamot | 60 |
| Ylang | 30 |
| Hydroxycitronellal | 180 |
| Phenethylol | 120 |
| Geraniol | 45 |
| (—)-citronellol | 45 |
| Linalool | 30 |
| Heliotropin | 30 |
| Methylionone | 60 |
| Anisaldehyde | 10 |
| Isoeugenol | 5 |
| Benzyl acetate | 60 |
| Amylcinnamic aldehyde | 30 |
| Purified styrax (50% in ethyl phthalate) | 45 |
| Civet (10% in ethyl phthalate) | 45 |

| Ingredients—Base composition—Contd.: | Parts by weight |
|---|---|
| Musk ketone | 55 |
| 1,1-dimethyl-6-tert.-butyl-4-acetyl-indane | 5 |
| Orange blossom absolute | 5 |
| Jasmin absolute (Grasse) | 25 |
| Rose absolute (Grasse) | 20 |
| Vetiveryl acetate | 40 |
| Santalol | 20 |
| | 995 |

Additive:
Methyl 4-(cis-2-penten-1-yl)-3-oxo-cyclopentyl-acetate _____ 5

1000

The additive exalts the jasmin note of the base composition.

*Example 11*

A composition having a lily of the valley type fragrance was prepared by blending the following ingredients in the proportions set forth:

| Ingredients—Base composition | Parts by weight |
|---|---|
| Hydroxycitronellal | 300 |
| Phenyl-ethyl-dimethyl-carbinol | 120 |
| Dimethyl-benzyl-carbinol | 30 |
| Phenethylol | 150 |
| (—)-Citronellol | 120 |
| Citronellyl formate | 5 |
| Benzyl acetate | 55 |
| Amylcinnamic aldehyde | 20 |
| Decanal (1% in ethyl phthalate) | 10 |
| Nonanal (1% in ethyl phthalate) | 5 |
| Phenylpropionaldehyde (10% in ethyl phthalate) | 5 |
| α-Methyl-p-isopropylphenylpropionaldehyde | 10 |
| Heliotropin | 30 |
| Linalool | 30 |
| Cinnamyl alcohol | 60 |
| α-Ionone | 30 |
| | 980 |

Additive:
Mixture of methyl 2- and 4-(trans-2-penten-1-yl)-3-oxo-cyclopentyl-acetates (1:1) _____ 20

1000

The additive develops a jasmin-like note (inherent in the natural lily of the valley fragrance) in the base composition and imparts thereto a more natural character.

*Example 12*

A reinforcer of the jasmin-type was prepared by blending the ingredients listed below in the proportions set forth:

| Ingredients: | Parts by weight |
|---|---|
| Hexylpentanone | 10 |
| α-Amylcinnamic aldehyde | 15 |
| Decyl acetate | 1 |
| γ-Undecalactone | 4 |
| Mixture of methyl 2- and 4-(cis-2-penten-1-yl)-cyclopentyl-acetates (1:1) | 70 |
| | 100 |

This reinforcer is useful for imparting a jasmin-like note to perfume compositions or to reinforce or enhance said note where it already exists in perfume compositions.

I claim:
1. A compound of the formula

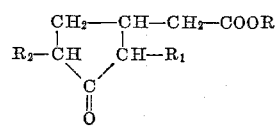

wherein one of the symbols $R_1$ and $R_2$ represents hydrogen and the other an unsubstituted alkenyl radical having 5 carbon atoms, and R represents one of the radicals methyl and ethyl.

2. A compound of the formula

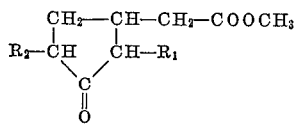

wherein one of the symbols $R_1$ and $R_2$ represents hydrogen and the other an unsubstituted unbranched alkenyl radical having 5 carbon atoms and having its double bond in one of the positions 2,3, 3,4 and 4,5.

3. Methyl 2-(cis-2-penten-1-yl)-3-oxo-cyclopentyl-acetate.

4. Methyl 4-(cis-2-penten-1-yl)-3-oxo-cyclopentyl-acetate.

5. Methyl 2 - (trans-2-penten-1-yl)-3-oxo-cyclopentyl-acetate.

6. Methyl 4 - (trans-2-penten-1-yl)-3-oxo-cyclopentyl-acetate.

References Cited by the Examiner

UNITED STATES PATENTS

| 2,015,239 | 9/1935 | Schrauth | 167—94 |
| 2,265,437 | 12/1941 | Luthy et al. | 167—94 |
| 2,491,442 | 12/1949 | Coleman | 260—468 |
| 2,992,269 | 7/1961 | Horrom et al. | 260—468 |
| 3,037,053 | 5/1962 | Umezawa | 260—514 |
| 3,158,644 | 11/1964 | Demole et al. | 260—468 |

FOREIGN PATENTS 449,221  6/1936  Great Britain.

OTHER REFERENCES

Demole et al., "Helvetica Chimica Acta," vol. 45, No. 2 (1962), pp. 675–703.

Bartlett et al., "J. Am. Chem. Soc.," vol. 62, pp. 2933–2938 (1940).

Ross, "J. Chem. Soc. (London)," vol. 127, pp. 2358–69 (1925).

LORRAINE A. WEINBERGER, *Primary Examiner.*

LEON ZITVER, *Examiner.*

R. K. JACKSON, *Assistant Examiner.*